United States Patent

Wang et al.

[11] Patent Number: 5,736,638
[45] Date of Patent: Apr. 7, 1998

[54] SCANNER HOUSING STRUCTURE

[75] Inventors: Oliver Wang; Hwang Chyi Lee, both of Taipei Hsien, Taiwan

[73] Assignee: Primax Electronics Ltd., Taiwan

[21] Appl. No.: 539,031

[22] Filed: Oct. 4, 1995

[51] Int. Cl.$^6$ ................................................ G01D 11/24
[52] U.S. Cl. .................................................... 73/431
[58] Field of Search .......................... 73/431; 235/472; 174/52.1

[56] References Cited

U.S. PATENT DOCUMENTS

| | | |
|---|---|---|
| 4,115,703 | 9/1978 | Dobras . |
| 4,409,848 | 10/1983 | Lutz .............................. 73/273 |
| 5,163,759 | 11/1992 | Jambor et al. . |

Primary Examiner—Robert Raevis
Attorney, Agent, or Firm—Limbach & Limbach

[57] ABSTRACT

The present invention is related to a scanner housing structure having an internal space for installing therein a charge-coupled device (CCD), a lens, a light gate piece and a reflecting mirror, which includes a housing floor, a first positioning device integrally formed on a surface of the housing floor for positioning the CCD, and a second positioning device integrally formed on the surface of the housing floor for positioning the lens. The present scanner housing structure is devoid of the holder used in a conventional scanner for supporting the above image pick-up elements, and allows the distance between the lens and the CCD to be directly adjusted without taking the lens and the CCD out of the scanner housing.

12 Claims, 2 Drawing Sheets

SCANNER HOUSING STRUCTURE

FIELD OF THE INVENTION

The present invention is related to a housing structure, and more particularly to a scanner housing structure.

BACKGROUND OF THE INVENTION

An image pick-up device generally used in a scanner is an assembly of a charge-coupled device (CCD), a light source, a light gate piece, a lens and a reflecting mirror or a contact image sensor (CIS) equivalent to the above elements. Generally speaking, CIS is too expensive to be as popular as the conventional elements is although CIS occupies a reduced space in the scanner. In conventional scanners in which the assembly of a charge-coupled device (CCD), a light source, a light gate piece, a lens and a reflecting mirror is used as an image pick-up device, a holder has to be prepared in advance for mounting therein these elements and then the holder in combination with the image pick-up device is placed on a housing floor of the scanner. Unfortunately, the holder has a large volume which almost occupies half of the volume of the scanner. In addition, the holder has to be made of a strengthened material in order to make the holder firm enough for supporting those elements. Moreover, if the user would like to adjust the distance between the lens and the CCD afterwards, the holder together with the elements has to be taken out to be adjusted and then placed back to the housing floor. Therefore, the existence of the holder occupies too much space of the scanner, increases manufacturing cost and causes inconvenience.

SUMMARY OF THE INVENTION

An object of the present invention is to provide a scanner housing structure which has a plurality of positioning devices integrally formed on a housing floor of the scanner housing structure for purpose of omitting the use of a holder.

Another object of the present invention is to provide a scanner housing structure in which the distance between the lens and the CCD can be directly adjusted without taking the lens and the CCD out of the scanner housing.

In accordance with the present invention, a scanner housing structure having an internal space for installing therein a charge-coupled device (CCD), a lens, a light gate piece and a reflecting mirror, includes a housing floor, a first positioning device integrally formed on a surface of the housing floor for positioning the CCD, and a second positioning device integrally formed on the surface of the housing floor for positioning the lens.

In accordance with another aspect of the present invention, the scanner housing structure further includes a third positioning device integrally formed on the surface of the housing floor for positioning the light gate piece. The third positioning device preferably includes two positioning posts, each of which has a groove for receiving each side portion of the light gate piece.

In accordance with another aspect of the present invention, the scanner housing structure further includes a fourth positioning device integrally formed on the surface of the housing floor for positioning the reflecting mirror. The fourth positioning device preferably includes two mounting pieces, each of which has a slant for locating thereon each side portion of the reflecting mirror, and two securing pieces, each of which is arranged near one of the mounting pieces for cooperating with the mounting piece for securing the reflecting mirror in place.

In accordance with another aspect of the present invention, the scanner housing structure further includes a housing roof covering the internal space and having a window thereon aligned with the second positioning device for adjusting the positioning situation of the lens in the second positioning device.

In accordance with another aspect of the present invention, the first positioning device includes a positioning frame for receiving the CCD, and two threaded holes, each of which is located at one side of the positioning frame and receiving therein a screw, respectively, for holding the CCD within the frame and adjusting a position of the CCD in the first positioning device.

In accordance with another aspect of the present invention, the scanner housing structure has two through holes on a housing wall thereof for permitting the adjustment of the screws, respectively, from external.

In accordance with another aspect of the present invention, the second positioning device includes a seat for receiving the lens, and two positioning holes residing in two sides of the seat, respectively, for positioning the lens on the seat. In this case, the scanner housing structure preferably further includes a resilient piece having two side portions thereof secured to the two positioning holes by two screws, respectively, for positioning the lens on the seat.

In accordance with another aspect of the present invention, the second positioning device includes two sets of positioning holes for selectively positioning the lens at two kinds of locations on the seat.

In accordance with another aspect of the present invention, the scanner housing structure further includes a fifth positioning device integrally formed on the housing floor for positioning two transmission rollers used for feeding an article.

In accordance with another aspect of the present invention, the scanner housing structure further includes two screw receivers integrally formed on the housing floor for positioning a light source seat.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
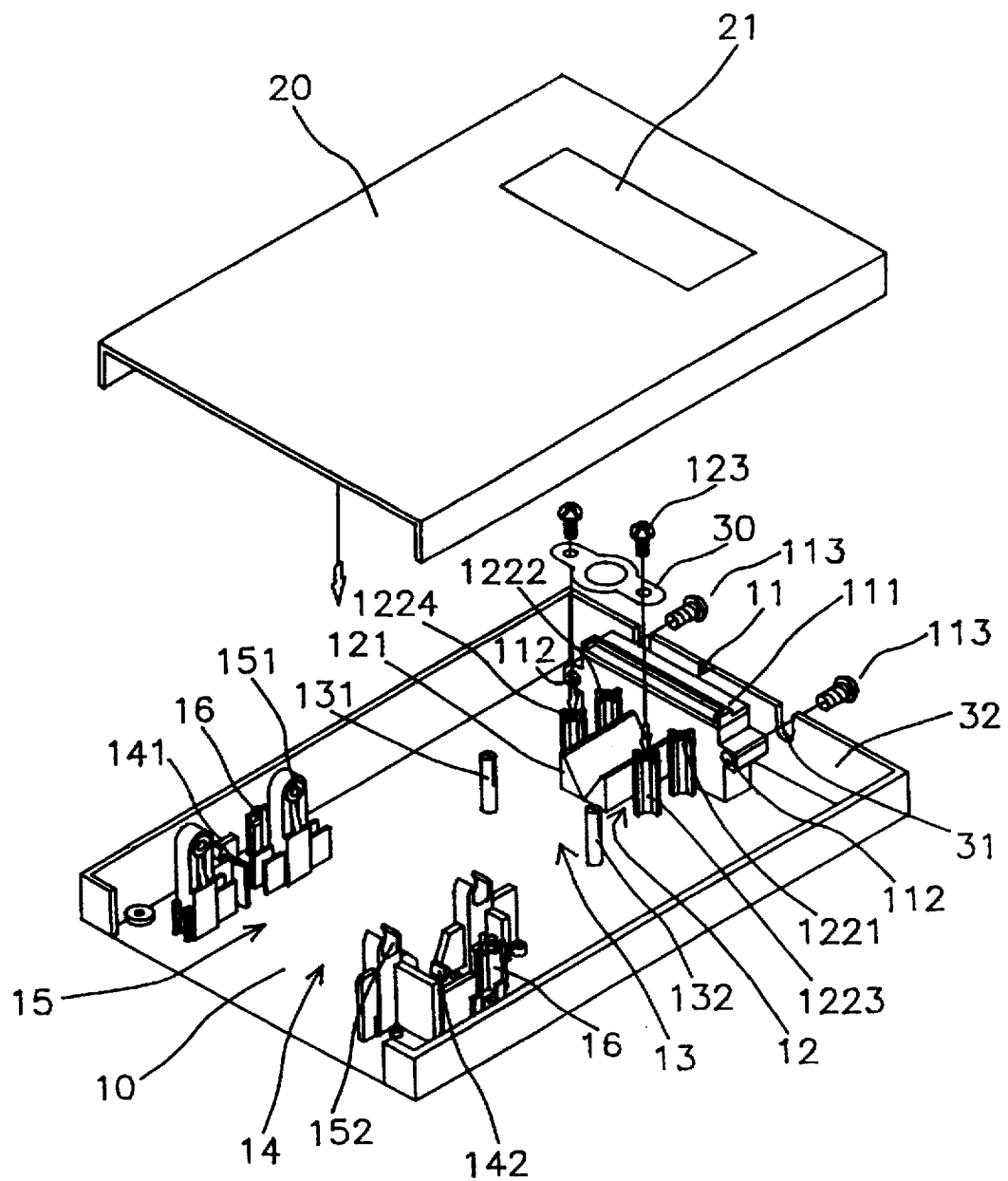
FIG. 1 is a schematic perspective view of a preferred embodiment of a scanner housing structure according to the present invention.

Please refer to FIG. 1 which is a schematic perspective view of a preferred embodiment of a scanner housing structure according to the present invention. The scanner housing structure shown in FIG. 1 includes a housing floor 10, a first, a second, a third, a fourth and a fifth positioning devices 11, 12, 13, 14 and 15 integrally formed on the housing floor 10, and a housing roof 20 having a window 21 thereon. The five positioning devices 11, 12, 13, 14 and 15 are used for respectively positioning a CCD, a lens, a light gate piece, a reflecting mirror and two rollers, which are not shown in the drawing in order to simplify and clarify the drawing.

As shown in FIG. 1, the first positioning device 11 includes a positioning frame 111 for receiving the CCD, and two threaded holes 112, each of which is located at one side of the positioning frame 111 and receiving therein a screw 113, respectively, for holding the CCD within the frame 111 and adjusting a position and/or an angle of the CCD in the first positioning device 11. The second positioning device 12 includes a seat 121 for receiving the lens, and two sets of positioning holes 1221, 1222, 1223, and 1224 mounted on two sides of the seat 121, respectively, for positioning the lens on the seat 121. As known to those skilled in the art, the locations of the CCD and the lens and the distance between a CCD and a lens should be precisely adjusted so that a better scanning quality can be obtained. In order to achieve this purpose, the scanner housing structure is made to have two through holes 31 on a housing wall 32 thereof for permitting the adjustment of the screws, respectively, from external so that the position and/or the angle of the CCD can be adjusted anytime without opening the housing roof 20. On the other hand, the window 21 is made on the housing roof 20 and is aligned with the second positioning device 12 in order to adjust the positioning situation of the lens in the second positioning device. In addition, the second positioning device 12 includes two sets of positioning holes so that two kinds of locations can be selected to position the lens on the seat 121 for adjusting the distance between the lens and the CCD, in which the first kind of location is configured by the positioning holes 1221 and 1222 and the second kind of location if configured by the positioning holes 1223 and 1224. The alteration between the two kinds of locations can also be done through the window 21. In order to fix the lens on the seat 121, the scanner housing structure further includes a resilient piece 30 having two side portions thereof secured to the two positioning holes 1223 and 1224 (or 1221 and 1222) by two screws 123, respectively, for positioning the lens on the seat 121.

Figure 2:
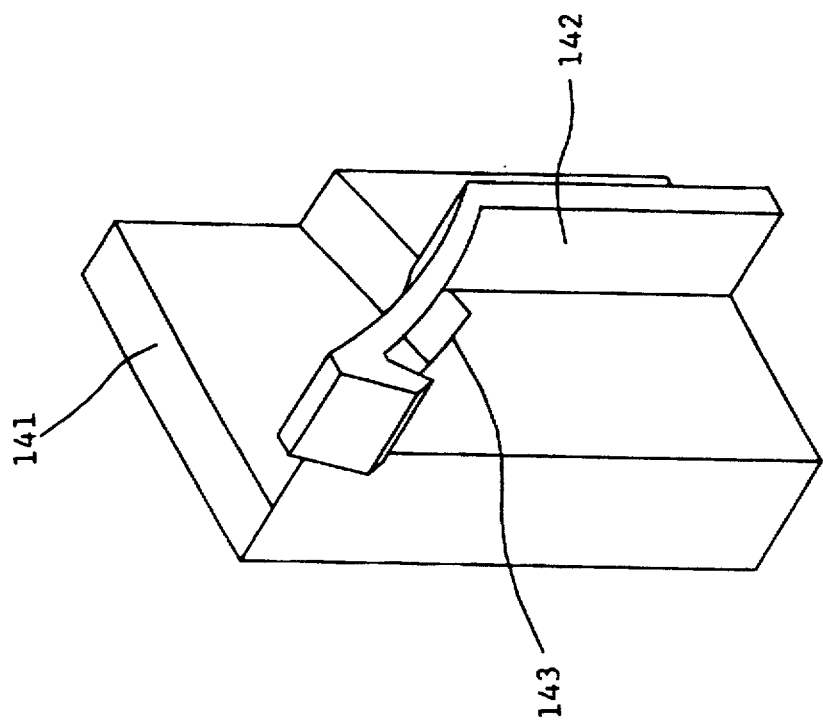
FIG. 2 is an enlarged view of a part of the fourth positioning device shown in FIG. 1.

The third positioning device 13 includes two positioning posts 131, each of which has a groove 132 for receiving each side portion of the light gate piece. The fourth positioning device 14 includes two mounting pieces 141, each of which has a slant 143 (FIG. 2) for locating thereon each side portion of the reflecting mirror, and two securing pieces 142, each of which is installed near one of the mounting pieces 141 for cooperating with the mounting piece 141 for securing the reflecting mirror in place. The fifth positioning device 15 is used for positioning two transmission rollers (not shown) thereon. As shown in the drawing, the pivot of each of the transmission rollers has one end thereof inserted into the hole 151 of the positioning device 15, and has the other end thereof propped up by the concave portion 152 of the fifth positioning device 15. In this preferred embodiment, the scanner housing structure further includes two screw receivers 16 integrally formed on the housing floor 10 for receiving screws to position a light source seat (not shown).

The present invention is mainly characterized in that the devices for positioning the CCD and the lens are set to be integrally formed on the housing floor of the scanner so that the holder used in a conventional scanner can be omitted in the present invention. That is, both of the scanner inner space and the manufacturing cost can be economized. Of course, in order to maintain the required scanning quality on the basis of the above prerequisite, some improvements on the scanner housing structure as the disclosed in the preferred embodiment shown in FIG. 1 are preferably made.

The reason why the holder used in the conventional scanner are not suitable to be integrally formed with the housing floor will be described as follows. The housing of a scanner is generally made of plastic material. When the housing is assembled, a torsion is likely to be generated. The torsion will cause a little bit of change in the shape of the housing, and further cause a change in the distance between the lens and the CCD, which is critical for the scanning quality.

As for the window of the housing roof, a tab, an outer housing or the like can be used for covering the window and preventing it from dust or mis-operation. Of course, if the scanner is built in a computer, it does not matter whether the window is covered or not.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanner housing structure having an internal space for installing therein a charge-coupled device (CCD), a lens, a light gate piece and a reflecting mirror, comprising:

a housing floor having two through holes thereon;

a housing roof having a window thereon;

a first positioning device integrally formed on a surface of said housing floor, including a positioning frame for receiving said CCD and two threaded holes, each of which is located at one side of said positioning frame and which receives therein a screw respectively for holding said CCD within said frame and adjusting a position of said CCD in said first positioning device; and a second positioning device integrally formed on said surface of said housing floor for positioning said lens.

2. A scanner housing structure according to claim 1 further comprising a third positioning device integrally formed on said surface of said housing floor for positioning said light gate piece.

3. A scanner housing structure according to claim 2 wherein said third positioning device includes two positioning posts, each of which has a groove for receiving each side portion of said light gate piece.

4. A scanner housing structure according to claim 3 further comprising a fourth positioning device integrally formed on said surface of said housing floor for positioning said reflecting mirror.

5. A scanner housing structure according to claim 4 wherein said fourth positioning device includes:

two mounting pieces, each of which has a slant for locating thereon each side portion of said reflecting mirror; and two securing pieces, each of which is formed near one of said mounting pieces for cooperating with said mounting piece for securing said reflecting mirror in place.

6. A scanner housing structure according to claim 4 further comprising a fifth positioning device integrally formed on said housing floor for positioning two transmission rollers used for feeding an article.

7. A scanner housing structure according to claim 1 wherein said housing roof covers said internal space and has said window thereon aligned with said second positioning device for adjusting the positioning situation of said lens in said second positioning device.

8. A scanner housing structure according to claim 1 having said two through holes on a housing wall thereof for permitting the adjustment of said screws, respectively, from the exterior.

9. A scanner housing structure according to claim 1 wherein said second positioning device includes:

a seat for receiving said lens; and two sets of positioning holes residing in two sides of said seat, respectively, for positioning said lens on said seat.

10. A scanner housing structure according to claim 9 wherein said scanner housing structure further includes a resilient piece having two side portions thereof secured to each set of said two sets of positioning holes by two screws, respectively, for positioning said lens on said seat.

11. A scanner housing structure according to claim 10 wherein said second positioning device includes said two sets of positioning holes for selectively positioning said lens at two kinds of locations on said seat.

12. A scanner housing structure according to claim 1 further comprising two screw receivers integrally formed on said housing floor for positioning a light source seat.

* * * * *